United States Patent

Turner

[11] 4,067,256
[45] Jan. 10, 1978

[54] FASTENER ANCHOR FORMED IN THERMOPLASTIC SHEET

[75] Inventor: Roger C. Turner, Arlington, Va.

[73] Assignee: General Electric Company, Louisville, Ky.

[21] Appl. No.: 730,311

[22] Filed: Oct. 7, 1976

[51] Int. Cl.$^2$ .................. F16B 17/00; F16B 37/00
[52] U.S. Cl. ........................... 85/32 V; 85/36; 264/92; 85/DIG. 2
[58] Field of Search ............... 85/32 V, 32 R, 35, 36, 85/DIG. 2, 54; 151/41.71; 52/309.2, 309.8, 509, 511, 512; 264/DIG. 66, 320, 164, 92, 90; 428/99

[56] References Cited

U.S. PATENT DOCUMENTS

| | | | |
|---|---|---|---|
| 1,121,369 | 12/1914 | Johnston | 85/32 V |
| 1,981,813 | 11/1934 | Schuster | 24/108 |
| 2,029,043 | 1/1936 | Wendell et al. | 47/55 |
| 2,383,164 | 8/1945 | Ryder | 85/36 |
| 2,482,339 | 9/1949 | Hibbard et al. | 52/309.2 |
| 2,590,264 | 3/1952 | Meyers et al. | 85/DIG. 2 |
| 2,678,074 | 5/1954 | Adams | 85/32 R |
| 2,709,290 | 5/1955 | Rosenthal | 85/DIG. 2 |
| 3,280,875 | 10/1966 | Fischer | 151/41.73 |
| 3,362,280 | 1/1968 | Muller | 85/35 |
| 3,378,972 | 4/1968 | Stanley | 52/309.2 |
| 3,611,864 | 10/1971 | Buckley | 85/DIG. 2 |
| 3,654,047 | 1/1970 | Berkowitz | 161/7 |
| 3,826,458 | 7/1974 | Fisher | 248/239 |
| 3,901,995 | 8/1975 | Conlon | 428/174 |
| 3,919,382 | 11/1975 | Smarook | 264/114 |

FOREIGN PATENT DOCUMENTS 2,018,390  10/1971  Germany .................. 85/32 V

Primary Examiner—Marion Parsons, Jr.
Attorney, Agent, or Firm—Steven C. Schnedler; Francis H. Boos

[57] ABSTRACT

A recess-type, screw-receiving fastener is formed directly into a thermoplastic sheet, preferably during the same operation which forms the plastic sheet into a useful configuration, such as a refrigerator inner liner. The fastener, when viewed from the rear side, resembles a plurality of "pinches" forming gusset-like folds. From the front side, it comprises a central recess in communication with side recesses formed by the interiors of the gusset-like folds. The central recess is adapted for receiving a male fastener such as a screw and the gusset-like folds distribute the load into a sufficient surrounding area of the plastic sheet.

7 Claims, 6 Drawing Figures

FASTENER ANCHOR FORMED IN THERMOPLASTIC SHEET

BACKGROUND OF THE INVENTION

1. Field of the Invention

The present invention relates generally to a recess-type fastener for receiving a male fastener such as a screw and, more particularly, to such a recess-type fastener for fastening to thin plastic sheet material, for example a vacuum-formed plastic refrigerator inner liner.

2. Description of the Prior Art

In the field of fastening technology, it is frequently necessary to fasten to thin plastic sheet material. One example is in a household refrigerator where shelf supports or the like are attached to an inner liner formed of thermoplastic material. A mere screw-receiving aperture in the plastic is an unsatisfactory solution, except for extremely light loads, because insufficient area for thread engagement results and the entire load is concentrated on a very small portion of the plastic material. This can result in undesirable deformation or even cracking of the plastic sheet.

A typical prior art fastener for applying a heavy load to thin plastic sheet material comprises a separate plastic screw anchor applied to a suitable aperture in the plastic liner, generally from the rear side thereof. Such a separate plastic screw anchor typically includes a bore for receiving a screw and, additionally, a relatively large-diameter, force-distribution portion for contacting a significant area on the rear side of the plastic liner. This, of course, serves to distribute the load over a greater portion of the liner material. Such fasteners, while generally effective, represent an additional costly part required in the manufacture of a refrigerator.

An additional consideration in the design of a fastener for use in a refrigerator is compatibility with insitu foamed urethane thermal insulation material. During the foaming process, prior to solidification and hardening of the foam, large forces are developed which tend to force foam material through any apertures in the liner. Since typical prior art fasteners require an aperture in the inner liner, a sealing ring is typically employed, and this represents additional cost.

SUMMARY OF THE INVENTION

Accordingly, it is an object of the invention to provide an integral screw-receiving fastener for retaining loads on a plastic sheet.

It is another object of the invention to provide such a fastener which is fully compatible with insitu foamed urethane insulation technology.

These and other objects are accomplished by the invention in which a recess-type, screw-receiving fastener is formed directly in a thermoplastic sheet, obviating the need for a separate part. The fastener may advantageously be formed during the same vacuum forming operation which forms the plastic sheet into a useful configuration, such as a refrigerator inner liner. The fastener, when viewed from the rear side thereof, resembles a plurality of "pinches" forming gusset-like folds and, from the front side, comprises a central recess and side recesses formed by the interiors of the gusset-like folds. Each of the side recesses is in communication with the central recess and each of the rear gusset-like folds extends from the central portion to a portion of the plastic sheet surrounding the central portion. The central recess thus forms a bore adapted for receiving a male fastener such as a screw and the gusset-like folds distribute the load into a sufficient surrounding area of the plastic sheet. Additionally, when insitu foamed urethane insulation is used, the rear portion of the gusset-like folds, resembling fins, bond to the foam as it turns rigid to distribute a portion of the load into the foam. The fastener provides no opportunity for leakage of foam material because no aperture is formed in the plastic sheet.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings in which:

DESCRIPTION OF THE PREFERRED EMBODIMENTS

Figure 1:
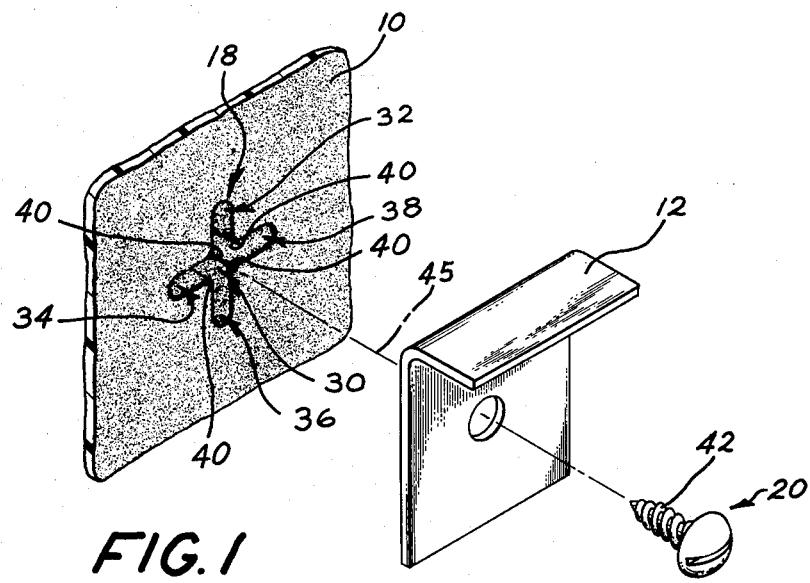
FIG. 1 is an exploded perspective view of the front side of one embodiment of the fastener according to the present invention, and an exemplary bracket and screw to be assembled thereto.
Figure 2:
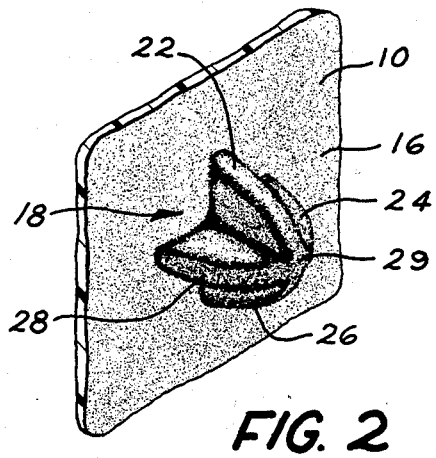
FIG. 2 is a rear perspective view of the fastener shown in FIG. 1.
Figure 3:
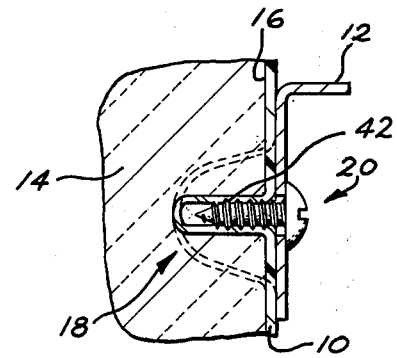
FIG. 3 is a sectional side view or the bracket and screw of FIG. 1 shown assembled to the fastener.

Referring first to FIGS. 1 through 3, there is shown a portion of a thermoplastic sheet or panel member 10 to which an exemplary shelf-supporting bracket 12 is to be securely attached. The plastic sheet 10 may, for example, be a portion of the inner liner of a refrigerator cabinet and, preferably, is backed by insitu foamed polyurethane insulation 14 (FIG. 3) on the rear side 16 thereof. A recess-type fastener 18, contemplated by the present invention, is formed in the plastic sheet 10. The fastener 18 is adapted to receive an exemplary screw 20 which securely holds the exemplary bracket 12. While in the illustrated embodiments the fastener 18 is shown receiving the screw 20, it will be apparent that other male fasteners, such as a pressed-in pin, could as well be received.

Referring especially to FIG. 2, the fastener 18, viewed from the rear side, generally resembles a multiplicity of "pinches" in the form of gusset-like folds 22, 24, 26 and 28, extending from around a central portion 29. Viewed from the front side (FIG. 1), the fastener 18 comprises a central recess 30 which is the interior of the central portion 29, and four side recesses 32, 34, 36 and 38 which are the interiors of the gusset-like folds 22, 24, 26 and 28, respectively. The central recess 30 is radially defined by plastic material at the intersections 40 of adjacent side recesses. The central recess 30 is thus adapted for receiving the screw 20, being properly-sized for engagement of the threads 42 with the plastic material at the intersections 40. In the operation of the invention, the screw 20 is driven in conventional self-tapping fashion into the fastener 18 to securely hold the bracket 12 against the front side 44 of the panel 10, as shown in FIG. 3.

Preferably, each of the gusset-like folds 32, 34 and 36 and 38 is substantially normal to the longitudinal axis 45 of the central recess 30, and the longitudinal axis is perpendicular to the plane of the sheet 10. This permits the screw 20 to be driven into the fastener 18 perpendicularly to the plastic sheet 10. However, for special purpose applications, the fastener 18 may be configured to tilt the central recess 30 at an angle to the sheet 10.

Referring again particularly to FIG. 2, the gusset-like folds 22, 24, 26 and 28 extend from the central portion 29 to the portion of the plastic sheet 10 surrounding the fastener 18. The gusset-like folds thus transmit the loading of the bracket 12 and the screw 20 to a wider portion of the panel 10 than a mere aperture would, thereby avoiding a concentration of stress on a particular portion of the liner 10, which might otherwise excessively deform or crack.

In the application of the fastener 18 to the inner liner of a refrigerator cabinet, the space between the plastic sheet 10 and the outer case (not shown) of the refrigerator is typically filled with insitu foamed polyurethane insulation material 14. The fastener according to the present invention is well adapted in at least two respects for use in combination with foamed insulation technology. First, as stated above in the "Background of the Invention," during the foaming operation, before the material has hardened, relatively high pressures are developed. As a result, foam material tends to force its way through any apertures in the panel 10. Since the fastener 18 perferably does not interrupt the continuity of the plastic sheet 10, no aperture for possible foam leakage results. Secondly, the foam bonds to the side of the gusset-like folds 22, 24, 26 and 28. After the foam hardens this bond aids in transmitting the load imposed by the bracket 12 and screw 20 into the rigid foam material, increasing the total strength of the fastener.

Figure 4:
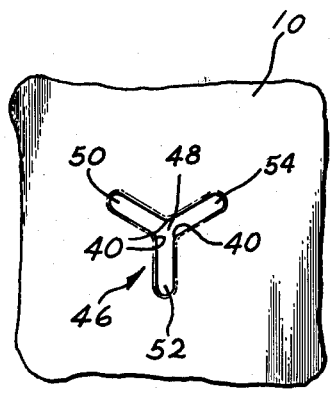
FIG. 4 is a front elevational view of an alternative embodiment of the present invention.

In the embodiment of the invention illustrated in FIGS. 1 through 3, the fastener 18 comprises four gusset-like folds. An alternative fastener embodiment 46, shown in FIG. 4, includes only three such folds. In FIG. 4, a central recess 48 is surrounded by only three communicating side recesses 50, 52 and 54, which of course are the interiors of gusset-like folds formed on the rear side of the panel 10.

Three is a preferred minimum number of folds required to form a fastener according to the invention, because that is the minimum number that will produce the definite intersections 40 which define a central recess or bore. There is no definite upper limit to the number of folds which form a fastener, although in each case, according to the size of the fastener, a practical upper limit will be found.

Figure 5:
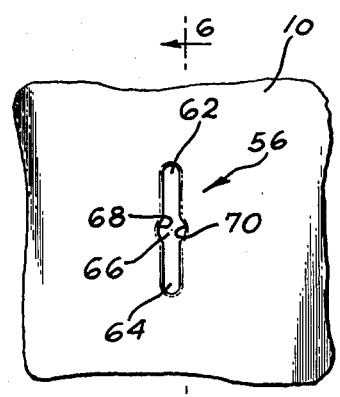
FIG. 5 is a front elevational view of another alternative embodiment of the invention.
Figure 6:
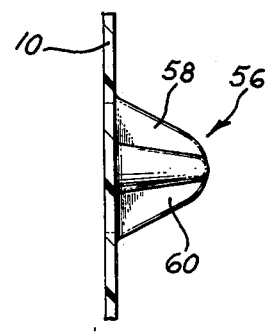
FIG. 6 is a sectional side view taken along line VI—VI of FIG. 5.

Another alternative fastener embodiment 56, shown in FIGS. 5 and 6, comprises only two gusset-like folds 58 and 60, and corresponding side recesses 62 and 64. In the fastener 56, a central recess 66 comprises two segments 68 and 70 of a plastic cylinder, there being no definite intersections between adjacent side recesses. It will be apparent that the principle of the embodiment of FIGS. 5 and 6 could be further extended to a fastener (not shown) comprising a central recess and only a single side recess. It will be further apparent that any such fastener comprising less than three folds will be deficient in load-transmitting ability in certain directions, and thus generally not preferred. However, in particular applications such fasteners may be satisfactory.

A fastener according to the present invention may be manufactured and formed into the plastic sheet 10 at the same time the plastic sheet is formed into a useful shape such as a plastic refrigerator inner liner. This results in maximum economy in manufacture. A plastic refrigerator liner may be formed in a conventional vacuum-forming operation in which the sheet is heated to soften the plastic material which is then drawn into a negative mold to produce the desired configuration of a refrigerator inner liner including an integral fastener. In order to form the relatively abrupt draw which the fastener according to the present invention represents, a "plug assist" may be employed. The "plug assist" may be accomplished by simply inserting a suitably shaped member from the front side of the plastic sheet to push a portion of the plastic material into a suitable recess in the vacuum-forming negative mold.

Alternatively, a corresponding process may be employed using a positive mold where the thermally-softened plastic sheet is drawn over a mold. At an appropriate stage in the process, recess-forming blades would be extended out of the mold body, and then retracted.

It will thus be apparent that the present invention provides a recess-type fastener which is formed directly in a thermoplastic sheet to effectively anchor a screw or the like and to distribute the load over a sufficiently large area of plastic material to support the weight. Further, when employed with insitu foamed insulating material, the fastener distributes a portion of the load into the rigid foam material and, during the foaming operation, has the advantage of not providing any opening for the escape of foam material.

While specific embodiments of the present invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A recess-type fastener formed in a plastic component vacuum-formed from a thermoplastic sheet:
   said fastener integrally formed in said component;
   said fastener adapted for receiving a male fastener and comprising:
      a central portion, said central portion including a central recess in the interior thereof; and
      a gusset-like fold extending from said fastener central portion to a portion of the plastic sheet surrounding said central portion, said gusset-like fold forming a side recess in communication with said central recess and distributing a load exerted by the male fastener over a large area of the plastic component surrounding said recess.

2. A fastener according to claim 1 which comprises at least three gusset-like folds and wherein the intersections of adjacent side recesses are adapted for engaging the male fastener.

3. A fastener according to claim 2, wherein each of said gusset-like folds is substantially normal to the longitudinal axis of the central portion and the longitudinal axis is perpendicular to the plane of the plastic sheet.

4. A fastener according to claim 2 comprising exactly three gusset-like folds.

5. A fastener according to claim 2 comprising exactly four gusset-like folds.

6. A recess-type fastener formed in a refrigerator liner vacuum-formed from a thermoplastic sheet:

said fastener integrally formed in said liner;
said fastener adapted for receiving a male fastener to attach an article to the liner and comprising:
a central portion, said central portion including a central recess in the interior thereof;
a plurality of gusset-like folds extending from said fastener central portion to a portion of the plastic liner surrounding said central portion;
said gusste-like folds forming side recesses in communication with said central recess and distributing a load exerted by the male fastener over a large area of the liner surrounding said central recess; and
the intersections of adjacent side recesses providing surfaces for engaging the male fastener.

7. A fastener according to claim 6, wherein the integrally formed fastener provides uninterrupted continuity with said liner thereby preventing any aperture which would provide opportunity for leakage during subsequent processing or use of the liner.

* * * * *